(12) United States Patent
Strauser

(10) Patent No.: US 7,742,293 B2
(45) Date of Patent: Jun. 22, 2010

(54) ADAPTABLE DIGITAL MUSIC PLAYER CRADLE

(76) Inventor: Jack Strauser, 6365 53rd St. North, Suite B, Pinellas Park, FL (US) 33781

( * ) Notice: Subject to any disclaimer, the term of this patent is extended or adjusted under 35 U.S.C. 154(b) by 793 days.

(21) Appl. No.: 11/676,850

(22) Filed: Feb. 20, 2007

(65) Prior Publication Data

US 2008/0197050 A1 Aug. 21, 2008

(51) Int. Cl.
*H05K 5/00* (2006.01)
*H05K 7/00* (2006.01)

(52) U.S. Cl. ................ 361/679.41; 361/679.4

(58) Field of Classification Search ............ 361/679.01, 361/679.4, 679.41
See application file for complete search history.

(56) References Cited

U.S. PATENT DOCUMENTS

D513,938 S 1/2006 Griffin

| | | |
|---|---|---|
| 2004/0150944 A1 | 8/2004 | Byrne et al. |
| 2006/0116009 A1 | 6/2006 | Langberg et al. |
| 2006/0127034 A1 | 6/2006 | Brooking et al. |
| 2006/0181840 A1* | 8/2006 | Cvetko ................ 361/679 |
| 2006/0250764 A1* | 11/2006 | Howarth et al. ......... 361/683 |
| 2008/0307144 A1* | 12/2008 | Minoo ................ 710/304 |

* cited by examiner

*Primary Examiner*—Jayprakash N Gandhi
*Assistant Examiner*—Anthony M Haughton
(74) *Attorney, Agent, or Firm*—Larson & Larson, P.A.; Frank Liebenow

(57) ABSTRACT

A digital music player cradle for sequentially supporting multiple digital music players includes a base with a cavity in an upper surface. The cavity accepts an end portion of a largest digital music player of the multiple digital music players. A support wall extends from the upper surface of the base for supporting one of the digital music players at a time. A trough in the back of the base extends through the support wall and into the cavity. The trough is provided to route a data cable connected to the one of the multiple digital music players. A plurality of ledges is within the cavity. The ledges are of decreasing size towards the bottom of the cavity and each ledge is sized to hold a different one of the multiple digital music players.

20 Claims, 4 Drawing Sheets

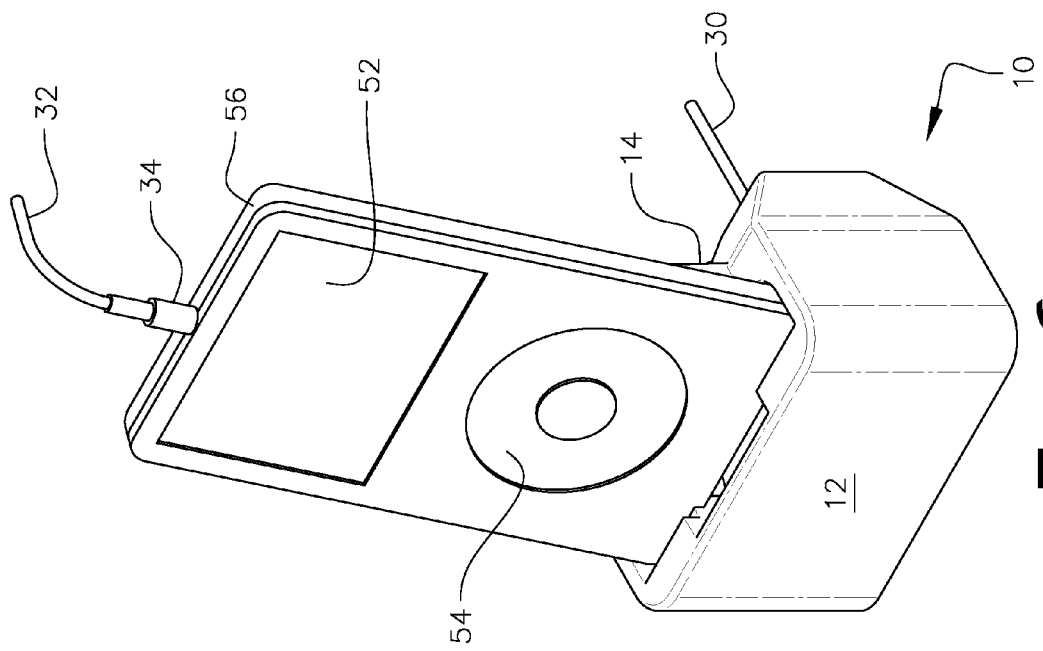
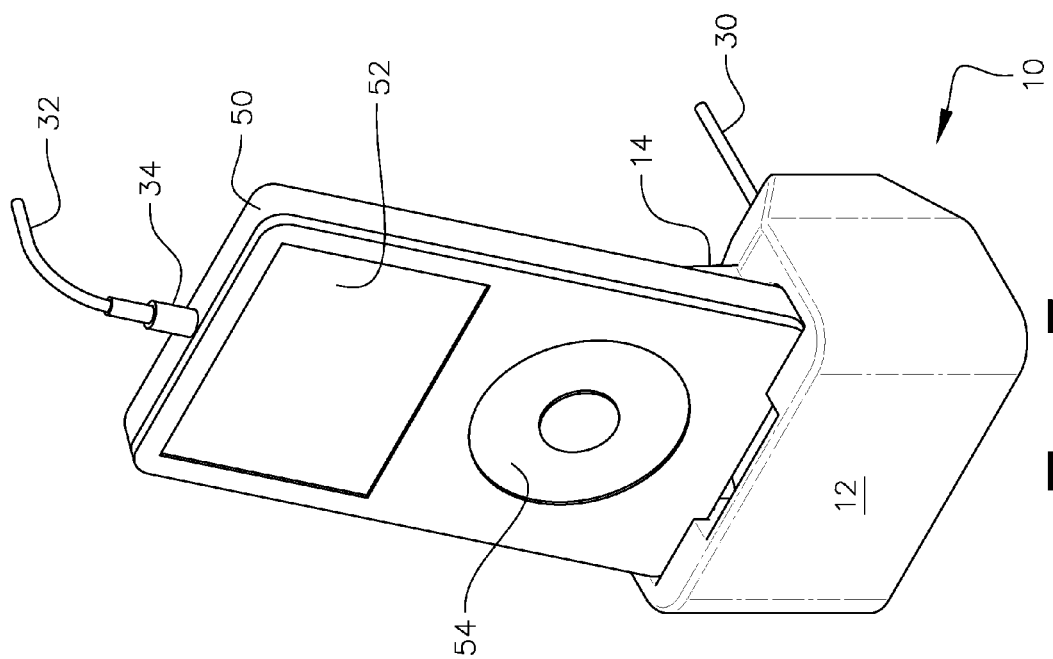

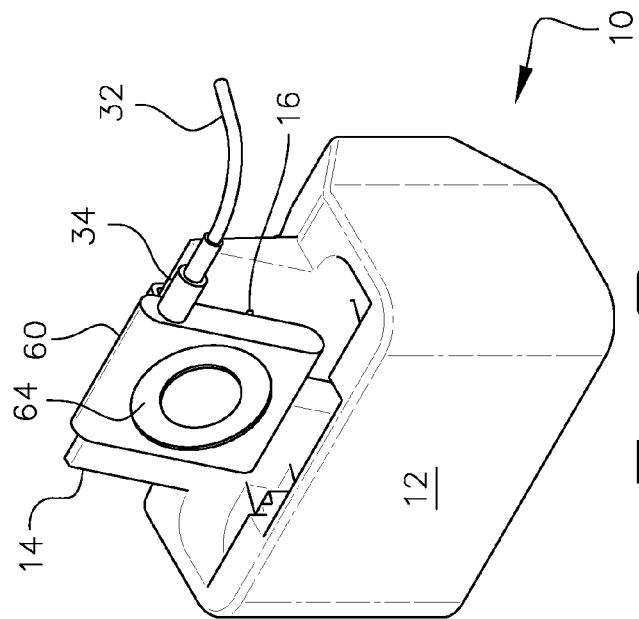
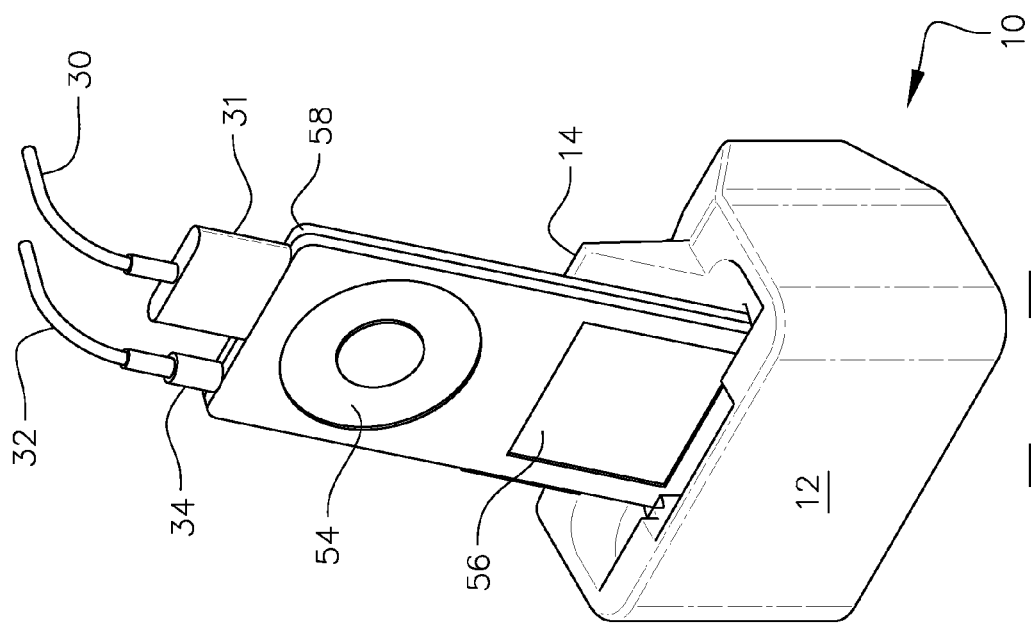

ADAPTABLE DIGITAL MUSIC PLAYER CRADLE

BACKGROUND OF THE INVENTION

1. Field of the Invention

This invention relates to digital music players and more particularly to a cradle for supporting and holding one of a selection of music players.

2. Description of the Related Art

Digital music players are well known in the industry. Generally, these devices have internal storage for storing songs in digital format, a display for providing user feedback and controls for accepting user inputs to direct the music player to convert one or more of the songs from digital format into analog so that the user can listen to the audio with headphones or through an amplifier and speakers.

Predominately, portable music players utilize songs or other audio content in the form of compressed digitized audio files (e.g., content). Music or other audio is converted to digital by an audio-to-digital converter (ADC), then sampled at a given rate, then compressed using a particular encoding standard such as MP3 (MPEG-2 layer 3) or WMA (Windows® Media Audio).

When used in a portable mode, digital music players are predominately used with earphones for a single user's pleasure. Although portable music players are perfect for use in a portable mode such as when walking or exercising, often such players are used in a stationary mode. There are two primary modes of stationary use: connected to an audio system for amplification and reproduction of music from the digital music player and connected to a computer for management and loading of content.

For connection to an audio system, often the audio input of the audio system is connected directly to the headphone jack of the digital music player and the music normally heard on the user's headphone is amplified and delivered to one or more speakers for the user's listening pleasure. Alternately, a connector, usually located on the bottom of the digital music player, interfaces to a mating connector and some of the pins on the connector carry the analog audio output from the digital music player to a cable that connects to the input of the audio system. There have been several docking systems designed for popular digital music players such as those marketed by Apple corporation. Additionally, some manufacturers market audio systems with docking cradles for specific digital music player such as the Apple Corporation iPod®. For example, Apple Corporation markets an alarm clock and amplified speakers called "XtremeMac Luna Speakers." The "XtremeMac Luna Speakers" have a docking cradle that accepts an iPod®, but users with different digital music players cannot use the docking cradle and must use this device's auxiliary audio input connected to the earphone jack of their music player. When connected in this fashion, the digital music player does not receive power from the audio system and is not supported or protected from damage or scratching.

For connection to a computer system, often a data cable is connected to the connector located on the bottom of the digital music player. Often, some of the pins on this connector include power pins to power the digital music player while connected to the computer as well as data pins for transferring digitized audio files to the digital music player from the computer. Often, the data pins conform to a computer interface standard such as Universal Serial Bus (USB), a standard supported by many existing computers. Such a standard often provides for two-way data transmission as well as power, usually 5 volts, DC.

There have been several computer connection docking systems designed for certain popular digital music players such as those marketed by Apple Corporation. For example, Apple Corporation markets an iPod® nano docking station for supporting the iPod® nano and connecting it to a computer system. Unfortunately, this docking station only accepts the iPod® nano and no other digital music players, not even other digital music players from the same manufacturer. A user having two different digital music players would need two different docking cradles.

Some docking cradles, such as those provided with digital music player from Apple Corporation, hold more than one variety of digital music players. For example the Apple Universal iPod® Dock holds any of the iPod® nano, 30 GB iPod®, 80 GB iPod®, etc. It does this with five different adapter inserts, requiring the user to swap inserts depending upon which digital music player they are currently using.

What is needed is a digital music player cradle that supports more than one class of music player.

SUMMARY OF THE INVENTION

In one embodiment, a digital music player cradle for sequentially supporting multiple digital music players is disclosed including a base with a cavity in an upper surface. The cavity accepts an end portion of a largest digital music player of the multiple digital music players. A support wall extends from the upper surface of the base for supporting one of the digital music players at a time. A trough in the back of the base extends through the support wall and into the cavity. The trough is provided to route a data cable connected to the one of the multiple digital music players. A plurality of ledges is within the cavity. The ledges are of decreasing size towards the bottom of the cavity and each ledge is sized to hold a different one of the multiple digital music players.

In another embodiment, a method of supporting multiple digital music players is disclosed including providing a digital music player cradle for supporting any one digital music player of the multiple digital music players. The digital music player cradle has a base with a cavity in an upper surface. The cavity accepts an end portion of a largest digital music player of the multiple digital music players. A support wall extends from the upper surface of the base for supporting one of the multiple digital music players at a time and a trough passes through the back side of the base, extends through the support wall and interfaces with the cavity to route a data cable connected to the one of the digital music players. Ledges of decreasing size towards a bottom of the cavity are configured to each hold a different one of the multiple digital music players. The method continues with connecting a first digital music player to a first end of the data cable and connecting a second end of the data cable connected to a computer system then inserting a first end of the first digital music player into the cavity with a back side of the first digital music player resting against the support wall. Next, the first digital music player is removed from the cavity and a second digital music player is connected to the first end of the data cable. The second digital music player has a different width than the first digital music player. Finally, a first end of the second digital music player is inserted into the cavity with a back side of the second digital music player resting against the support wall.

In another embodiment, a digital music player cradle for sequentially supporting multiple digital music players is disclosed including a base with an area for accepting an end portion of any one of the multiple digital music players and a support extending from an upper surface of the base for resting the digital music player. The base has a channel to allow a data cable connected to the digital music player to pass out to be connected to a computer system. Steps support the multiple digital music players within the area for supporting the digital music player, the steps including ledges of decreasing size towards the bottom of the area for supporting the digital music player and each ledge is sized to hold a different sized digital music players.

BRIEF DESCRIPTION OF THE DRAWINGS

The invention can be best understood by those having ordinary skill in the art by reference to the following detailed description when considered in conjunction with the accompanying drawings in which:

FIG. 5 illustrates an isometric view of a digital music player cradle of the present invention holding a large-sized digital music player.

FIG. 6 illustrates an isometric view of a digital music player cradle of the present invention holding a medium-sized digital music player.

FIG. 7 illustrates an isometric view of a digital music player cradle of the present invention holding a small-sized digital music player.

FIG. 8 illustrates an isometric view of a digital music player cradle of the present invention holding a micro-sized digital music player.

DETAILED DESCRIPTION OF THE INVENTION

Figure 1:
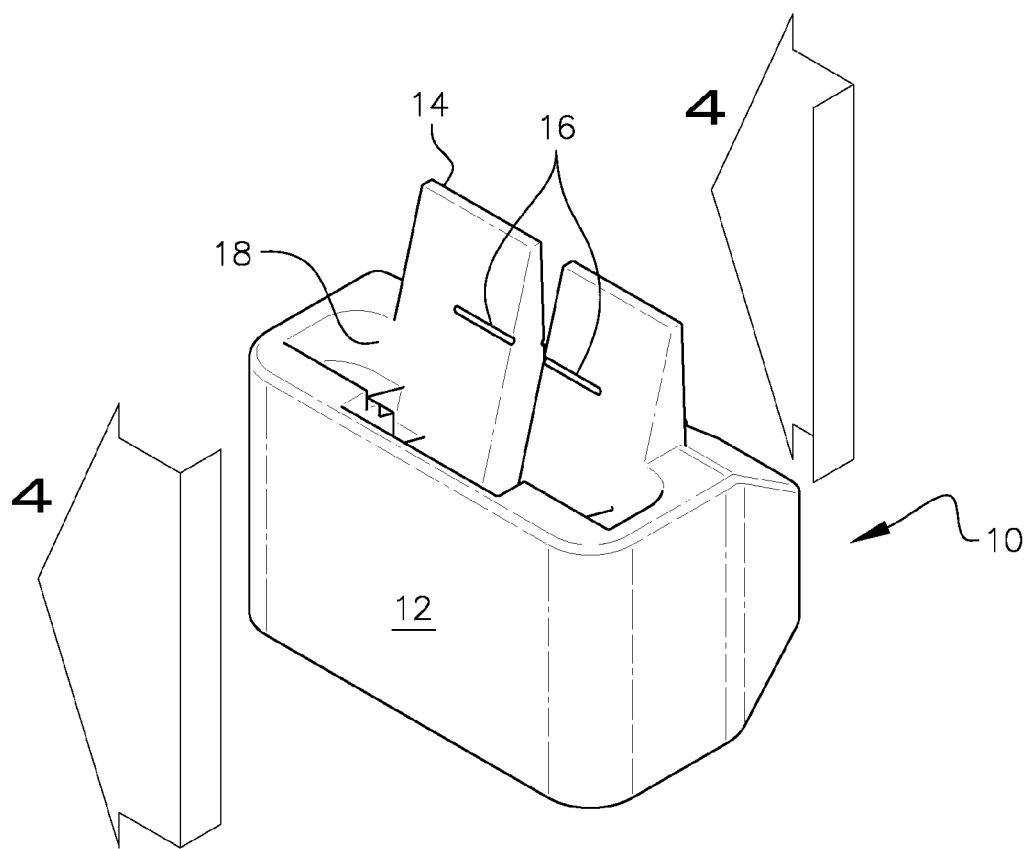
FIG. 1 illustrates an isometric view of a digital music player cradle of the present invention.

Reference will now be made in detail to the presently preferred embodiments of the invention, examples of which are illustrated in the accompanying drawings. Throughout the following detailed description, the same reference numerals refer to the same elements in all figures. In the following description, many different digital music players are currently on the market. These devices generally have persistent storage for storing audio content (music) such as a micro-hard disk or flash memory. Under user control, the audio files are retrieved, uncompressed and converted to analog audio. The analog audio signal is often emitted in a 3.5 mm stereo headphone jack for the user to connect headphones or other reproduction devices.

Referring to FIG. 1, an isometric view of a digital music player cradle of the present invention is described. The digital music player cradle 10 accommodates a variety of digital music players of various widths and thicknesses, thereby eliminating the need for multiple cradles or adapter inserts as provided in the past. The digital music player cradle 10 has a base 12, a cavity for containing an end of the digital music player (not shown) and a support wall 14 for supporting the digital music player on a slight slant towards the rear. In some embodiments, a pair of front clip indentations 16 is provided to hold a clip-on micro-sized music player (not shown).

Figure 2:
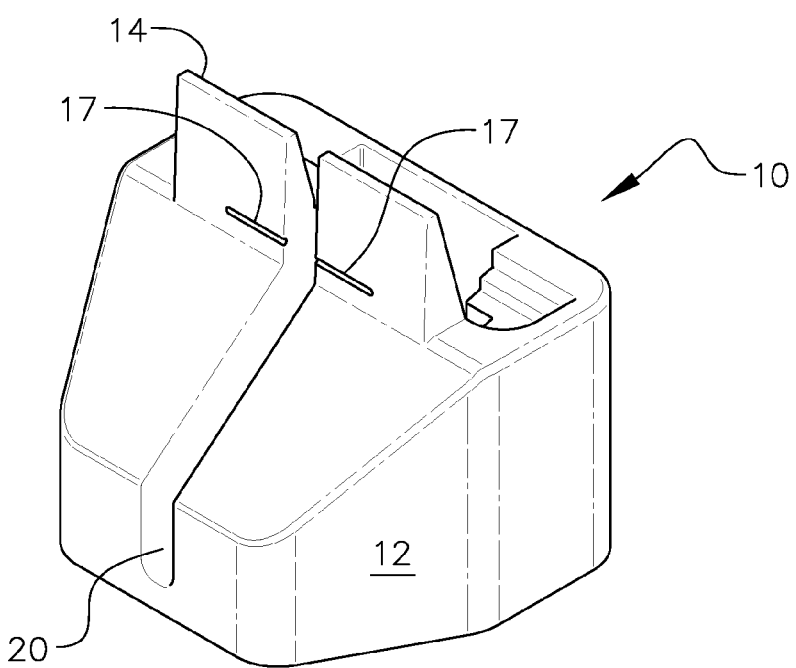
FIG. 2 illustrates an isometric view of a digital music player cradle of the present invention from the back.

Referring to FIG. 2, an isometric view of a digital music player cradle of the present invention from the back is described. Again, the digital music player cradle 10 accommodates a variety of digital music players of various widths and thicknesses. The digital music player cradle 10 has a base 12, a cavity for containing an end of the digital music player (not shown) and a support wall 14 for supporting the digital music player on a slight slant towards the rear. In some embodiments, a pair of front clip indentations 16 is provided to hold a clip-on micro-sized music player (not shown). Also, in some embodiments, a pair of rear clip indentations 17 is provided to hold a clip-on micro-sized music player (not shown).

A cable trough 20 is provided to route a data cable from the digital music player (not shown). Often, the digital music player (not shown) has a connector for connecting to a computer for transferring content through the data cable. As an example, many current digital music players have a connector for connecting to a Universal Serial Bus (USB) cable.

Figure 3:
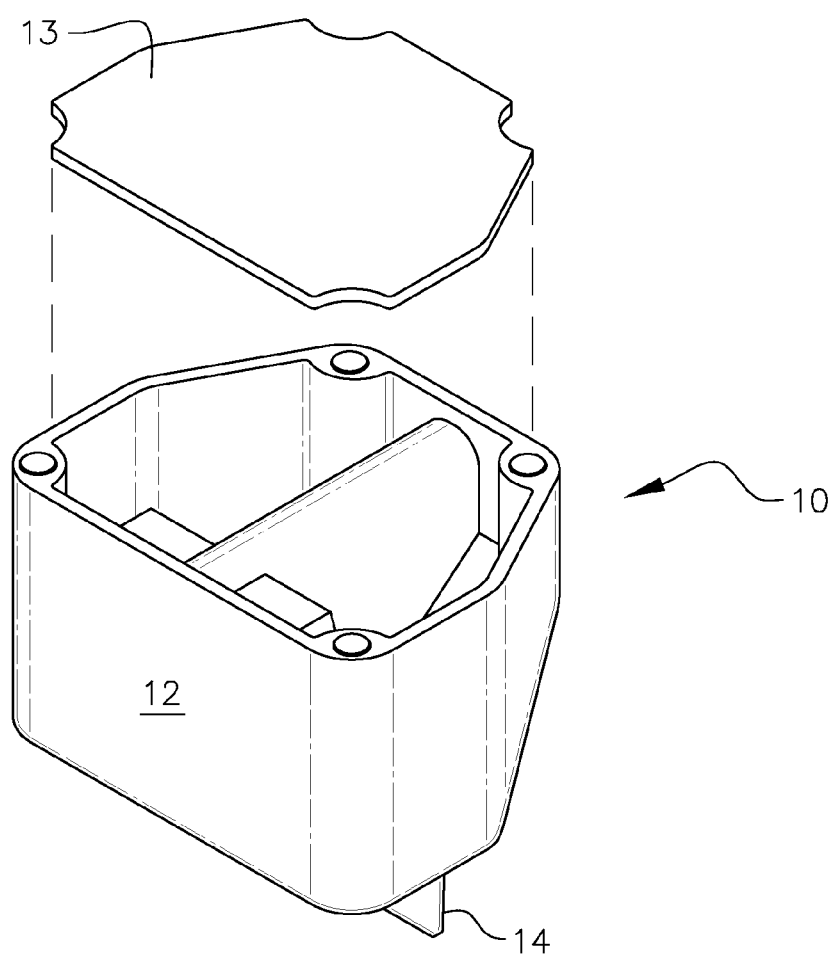
FIG. 3 illustrates an exploded view of a digital music player cradle of the present invention from the bottom.

Referring to FIG. 3, an exploded view of a digital music player cradle of the present invention from the bottom is described. In some embodiments, the base of the digital music player cradle 10 has a removable bottom 13. In some embodiments, balancing weights are disposed inside of the base 12 and sealed with the bottom 13 by various methods known in the art including, but not limited to, ultrasonic welding, adhesives, pressure fits, etc.

Figure 4:
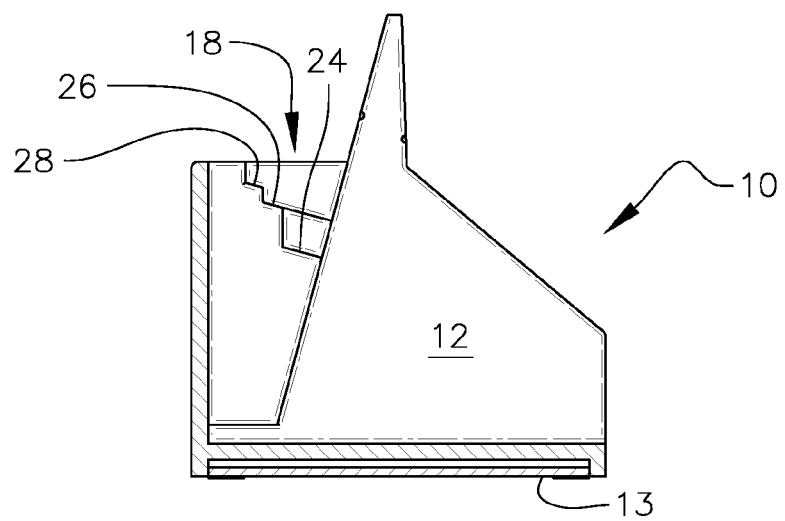
FIG. 4 illustrates a cross-sectional view of a digital music player cradle of the present invention along line 4-4 of FIG. 1.

Referring to FIG. 4, a cross-sectional view of a digital music player cradle of the present invention along line 4-4 of FIG. 1 is described. The base 12 digital music player cradle is shown with the bottom 13 installed. In this embodiment, the cavity 18 is shaped to hold the ends of three different digital music players. An end of a larger-sized digital music player such as an Apple Corporation 80 GB iPod® or a Microsoft Corporation Zume™ fits within the outer cavity formed by a ledge 28. An end of a medium-sized digital music player such as an Apple Corporation 30 GB iPod® fits within the middle cavity formed by a ledge 26. An end of a smaller-sized digital music player such as an Apple Corporation Nano® fits within the inner cavity formed by a ledge 24. Although shown having three ledges 24/26/28, the present invention is not limited in the number of sizes of digital music players supported. Any number of digital music players from two digital music players is supportable by the present invention. Also, although shown fitting with Apple Corporation products, the digital music player cradle 10 of the present invention is adaptable to any size and shape of digital music player.

Referring to FIG. 5, an isometric view of a digital music player cradle of the present invention holding a large-sized digital music player 50 is described. In this view, a large-sized digital music player 50 such as the Apple Corporation 80 GB iPod® or a Microsoft Corporation Zume™ is shown resting within the outer cavity formed by the ledge 28 and resting on the support wall 14. In such a position, the large-sized digital music player 50 is raised off the table surface, helping to prevent scratches and other damage. Many large-sized digital music players 50 have controls 54 for selecting songs, etc. and a display for informing the user of various modes of operation 52. Also, many large-sized digital music players 50 have a connector into which a stereo headphone jack 34 with cable 32 is inserted. The data cable 30 is connected to the large-sized digital music player 50 by a connector similar to the connector 31 as shown in FIG. 7 (not visible in this figure) and the data cable 30 is routed through the trough 20. The present invention functions with or without a data cable 30 and connector 31 attached. Likewise, the present invention functions with or without an audio cable 32 attached.

Referring to FIG. 6, an isometric view of a digital music player cradle of the present invention holding a medium-sized digital music player is described. In this view, a medium-sized digital music player 56 such as the Apple Corporation 30 GB iPod® is shown resting within the middle cavity formed by the ledge 26 and resting on the support wall 14. In such a position, the medium-sized digital music player 56 is raised off the table surface, helping to prevent scratches and other damage. Many medium-sized digital music players 56 have controls 54 for selecting songs, etc. and a display for informing the user of various modes of operation 52. Also, many medium-sized digital music players 56 have a connector into which a stereo headphone jack 34 with cable 32 is inserted. The data cable 30 is connected to the medium-sized digital music player 56 by a connector similar to the connector 31 as shown in FIG. 7 (not visible in this figure) and the data cable 30 is routed through the trough 20.

Referring to FIG. 7, an isometric view of a digital music player cradle of the present invention holding a small-sized digital music player is described. In this view, a smaller-sized digital music player 58 such as the Apple Corporation Nano® is shown resting within the inner cavity formed by the ledge 24 and resting on the support wall 14. In such a position, the smaller-sized digital music player 58 is raised off the table surface, helping to prevent scratches and other damage. Many smaller-sized digital music players 58 have controls 54 for selecting songs, etc. and a display for informing the user of various modes of operation 52. Also, many smaller-sized digital music players 58 have a connector into which a stereo headphone jack 34 with cable 32 is inserted. The data cable 30 is connected to the smaller-sized digital music player 58 by a connector similar to the connector 31 as shown in FIG. 7 (not visible in this figure) and the data cable 30 is routed through the trough 20. The present invention functions with or without a data cable 30 and connector 31 attached. Likewise, the present invention functions with or without an audio cable 32 attached. For some digital music players such as the smaller-sized digital music player 58, the orientation of the data connector 31 makes it difficult to rest properly in an upright position within the digital music player cradle 10. In such cases, the smaller-sized digital music player 58 rests in an upside-down configuration as shown in FIG. 7, still providing the benefit of keeping the smaller-sized digital music player off of the table surface and thereby protecting it.

Referring to FIG. 8, an isometric view of a digital music player cradle of the present invention holding a micro-sized digital music player is described. Some micro-sized digital music players 60 are very small and are designed to clip onto a user's clothing. Often, these micro-sized digital music players 60 such as the Apple Corporation Mini, have no display and only a control 64 for initiating the playing of audio, etc. To support micro-sized digital music players 60, a pair of front clip indentations 16 and a pair of rear clip indentations 17 are provided. Using these clip indentations 16/17, a clip of the micro-sized digital music player 60 clips onto the support wall and the edges of each side of the micro-sized digital music player's 60 clip is held within the clip indentations 16/17. Without the clip indentations, the micro-sized digital music player's 60 clip would not stay in place, especially if the digital music player cradle 10 is made from a slippery, plastic material. As stated previously, the present invention functions with one set of clip indentations 16/17, two sets of clip indentations 16/17 and without any clip indentations 16/17, depending upon the types and styles of digital music players supported.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A digital music player cradle for sequentially supporting multiple digital music players, the digital music player cradle comprising:
    a base;
    a cavity in an upper surface of the base, the cavity adapted to accept an end portion of a largest digital music player of the multiple digital music players;
    a support wall extending from the upper surface of the base for supporting one of the digital music players;
    a trough in a back side of the base extending through the support wall and interfacing with the cavity, the trough adapted to route a data cable connected to the one of the multiple digital music players; and
    a plurality of ledges within the cavity, the ledges of decreasing size towards a bottom of the cavity, whereas each ledge is sized to hold a different one of the multiple digital music players.

2. The digital music player cradle of claim 1, wherein the multiple digital music players consists of a large-sized digital music player, a medium-sized digital music player and a small-sized digital music player.

3. The digital music player cradle of claim 1, wherein the support wall has at least one front-clip indentation running substantially horizontal on a front surface for supporting a clip-on digital music player.

4. The digital music player cradle of claim 1, wherein the support wall has at least one rear-clip indentation running substantially horizontal on a back surface for supporting a clip-on digital music player.

5. The digital music player cradle of claim 1, wherein the data cable is a Universal Serial Bus cable for connecting to a computer system.

6. The digital music player cradle of claim 1, wherein the base is substantially hollow and the base comprises an upper base portion and a bottom base cover whereas the bottom base cover is adapted to retain a mass for providing additional stability.

7. A method of supporting multiple digital music players, the method comprising:
    providing a digital music player cradle for supporting any one digital music player of the multiple digital music players, the digital music player cradle comprising:
        a base;
        a cavity in an upper surface of the base, the cavity adapted to accept an end portion of a largest digital music player of the multiple digital music players;
        a support wall extending from the upper surface of the base for supporting one of the multiple digital music players at a time;
        a trough in the back side of the base extending through the support wall and interfacing with the cavity, the trough adapted to route a data cable connected to the one of the digital music players;
        a plurality of ledges within the cavity, the ledges of decreasing size towards a bottom of the cavity, whereas each ledge is sized to hold a different one of the multiple digital music players;
    connecting a first digital music player of the multiple digital music players to a first end of the data cable, a second end of the data cable connected to a computer system;

inserting a first end of the first digital music player into the cavity, a back side of the first digital music player resting against the support wall;

removing the first digital music player from the cavity;

connecting a second digital music player of the multiple digital music players to the first end of the data cable, the second digital music player having a different width than the first digital music player; and inserting a first end of the second digital music player into the cavity, a back side of the second digital music player resting against the support wall.

8. The digital music player cradle of claim 7, wherein the first digital music player is a large-sized digital music player and the second digital music player is a small-sized digital music player.

9. The digital music player cradle of claim 7, wherein the support wall has at least one front-clip indentation running substantially horizontal on a front surface for supporting a clip-on digital music player.

10. The digital music player cradle of claim 7, wherein the support wall has at least one rear-clip indentation running substantially horizontal on a back surface for supporting a clip-on digital music player.

11. The digital music player cradle of claim 7, wherein the data cable is a Universal Serial Bus cable for connecting to a computer system.

12. A digital music player cradle for sequentially supporting multiple digital music players, the digital music player cradle comprising:

a base;

a means for accepting an end portion of a digital music player of the multiple digital music players;

a means for supporting the digital music player extending from an upper surface of the base;

a means for routing a data cable from the means for accepting an end portion of the digital music player through the means for supporting the digital music player, the data cable connected to the digital music player; and an stepped means for supporting the multiple digital music players within the means for supporting the digital music player, the stepped means for supporting the multiple digital music players including ledges of decreasing size towards a bottom of the means for supporting the digital music player, whereas each ledge is sized to hold a different one of the multiple digital music players.

13. The digital music player cradle of claim 12, wherein the multiple digital music players consists of a large-sized digital music player, a medium-sized digital music player and a small-sized digital music player.

14. The digital music player cradle of claim 12, wherein the means for supporting the digital music player has a means for supporting a clip-on digital music player.

15. The digital music player cradle of claim 14, wherein the means for supporting a clip-on digital music player includes at least one front-clip indentation running substantially horizontal on a front surface for supporting a clip-on digital music player.

16. The digital music player cradle of claim 14, wherein the means for supporting a clip-on digital music player includes at least one rear-clip indentation running substantially horizontal on a front surface for supporting a clip-on digital music player.

17. The digital music player cradle of claim 12, wherein the data cable is a Universal Serial Bus cable for connecting to a computer system.

18. The digital music player cradle of claim 12, wherein the base is substantially hollow and the base comprises an upper base portion and a bottom base cover whereas the bottom base cover is adapted to retain a mass for providing additional stability.

19. The digital music player cradle of claim 12, wherein a first digital music player of the multiple digital music players is wider than a second digital music player of the multiple digital music players.

20. The digital music player cradle of claim 12, wherein a first digital music player of the multiple digital music players is thicker than a second digital music player of the multiple digital music players.

* * * * *